(12) United States Patent
Naert et al.

(10) Patent No.: US 6,231,116 B1
(45) Date of Patent: May 15, 2001

(54) ARRANGEMENT FOR VEHICLE BODY STRUCTURE

(75) Inventors: Michel Naert, Västra Frölunda; Hans Reich, Varberg; Lars Nordling, Ellös, all of (SE)

(73) Assignees: Volvo Personvagnar AB, Gothenburg; Lear Corporation Sweden Interior Systems AB, Hisings Backa, both of (SE)

( * ) Notice: Subject to any disclaimer, the term of this patent is extended or adjusted under 35 U.S.C. 154(b) by 0 days.

(21) Appl. No.: 09/402,188

(22) PCT Filed: Apr. 27, 1998

(86) PCT No.: PCT/SE98/00761

§ 371 Date: Mar. 14, 2000

§ 102(e) Date: Mar. 14, 2000

(87) PCT Pub. No.: WO98/49024

PCT Pub. Date: Nov. 5, 1998

(30) Foreign Application Priority Data

Apr. 29, 1997 (SE) .................................................. 9701601

(51) Int. Cl.⁷ ........................................................... B60J 7/00
(52) U.S. Cl. ........................... 296/192; 296/70; 296/208; 296/194; 296/192; 296/203.02
(58) Field of Search .............................. 296/70, 192, 194, 296/203.02, 208

(56) References Cited

U.S. PATENT DOCUMENTS

| 4,733,739 | 3/1988 | Lorenz et al. . |
| 5,088,571 | 2/1992 | Burry et al. . |
| 5,311,960 | * 5/1994 | Kukainis et al. ...................... 296/70 |
| 5,387,023 | * 2/1995 | Densean ................................ 296/194 |
| 5,549,344 | 8/1996 | Nishijima et al. . |
| 5,556,153 | 9/1996 | Kelman et al. . |
| 5,564,515 | * 10/1996 | Schambre .............................. 296/70 |
| 5,673,964 | * 10/1997 | Roan et al. ........................... 296/194 |
| 5,676,216 | * 10/1997 | Palma et al. .......................... 296/70 |
| 5,678,877 | * 10/1997 | Nishijima et al. .................... 296/208 |
| 5,685,598 | * 11/1997 | Inoue et al. ........................... 296/70 |
| 5,709,601 | * 1/1998 | Heck ...................................... 296/70 |
| 5,762,395 | * 6/1998 | Merrifield et al. .................... 296/208 |
| 5,823,602 | * 10/1998 | Kehman et al. ....................... 296/70 |
| 5,883,777 | * 3/1999 | Nishitani et al. ..................... 296/70 |
| 5,934,744 | * 8/1999 | Jergens et al. ........................ 296/70 |

\* cited by examiner

Primary Examiner—Joseph D. Pape
Assistant Examiner—Kiran B. Patel
(74) Attorney, Agent, or Firm—Samuels, Gauthier & Stevens, LLP

(57) ABSTRACT

The invention relates to an arrangement for a body structure (2) of a vehicle (1), comprising a load-carrying structure (3) which is arranged essentially transversal to the longitudinal direction of the vehicle and mounted in each side of the vehicle (1), and an air conditioning system comprising an air conditioning unit (10) having components for air treatment. The invention is characterized in that at least a section (11) of the air conditioning unit (10) is functionally integrated with beam structure (3). An integrated arrangement with high strength and low weight is provided, which arrangement can also be easily built into a vehicle.

8 Claims, 2 Drawing Sheets

ARRANGEMENT FOR VEHICLE BODY STRUCTURE

TECHNICAL FIELD

The present invention relates to an arrangement for a body structure of a vehicle according to the introduction of Patent Claim 1 below. The invention is intended in particular for use as a load-carrying, integrated body structure in association with the dashboard of a passenger car.

STATE OF THE ART

Modern motor vehicles, e.g. passenger cars, are in most cases constructed with a body construction which, in the front part of the vehicle, comprises an intermediate panel in the form of a plate which separates the passenger compartment of the vehicle from its engine space. Such a body construction also usually comprises a cross beam which is arranged in the region of the dashboard of the vehicle and extends at right angles to the longitudinal direction of the vehicle. In the majority of modern vehicles, the cross beam is arranged rigidly in the respective sides of the body and in this way spans the space between the sides of the body.

The cross beam is usually made of steel and is designed so that it provides the body with a predetermined rigidity and strength, and it is also shaped and dimensioned so as to constitute a mounting for the steering system, i.e. the steering column and the steering wheel. In some cases, the cross beam may also be dimensioned so that it provides protection against the engine penetrating the passenger compartment of the vehicle in the event of a collision and also in order to give the entire structure around the dashboard a high natural frequency.

The cross beam may also form part of a side-impact system in order to allow load to be absorbed in the event of a collision, which in turn contributes to increased safety of the vehicle. Furthermore, the cross beam may constitute a mounting element for various safety systems in the vehicle, e.g. air-bags and knee protection.

By virtue of the cross beam being fixed between the sides of the vehicle, it usually constitutes a supporting element for the dashboard of the vehicle, which conventionally includes an instrument cluster, an audio system, glove compartment etc. The dashboard is also designed with air distribution ducts, usually in the form of a defroster duct and a ventilation duct, for feeding air into the passenger compartment of the vehicle. The cross beam also often supports the air conditioning unit of the vehicle, which in turn comprises the components which are required for, for example, generating temperature-controlled air or for filtering air. The air conditioning unit is surrounded by a casing or housing which accommodates these components and which is then mounted rigidly in the cross beam.

In modern vehicles, the cross beam constitutes to an increasing extent a base for the assembly process around the dashboard, a number of components then being mounted on or in association with the cross beam.

The traditional arrangement of said cross beam and intermediate panel involves certain problems and disadvantages. Firstly, it may be mentioned that modern vehicles with traditional cross beam constructions are not designed with any coordination or integration as far as building into the vehicle is concerned. This means that the region around the cross beam and the intermediate panel constitutes a complex part of the vehicle, where a number of different components must be coordinated, with regard to on the one hand their construction and function and on the other hand the manner in which they are to be mounted in the vehicle. Components belonging to a number of different technical areas must then be coordinated in this part of the vehicle. In this way, a very complex arrangement is obtained, which usually has a low degree of integration. This has a negative effect on the manufacture, weight and cost of the vehicle.

According to the traditional approach, which is applied by the majority of car manufacturers, the cross beam arrangement is therefore mounted with the aid of a number of different separate components which are usually developed by different technical departments or sub-contractors, e.g. the air conditioning system, partition and air ducts of the vehicle. These components are then assembled so that they form a complete prefabricated structure. This complete structure can subsequently be mounted in the vehicle in association with the dashboard.

A further problem concerns the fact that the cross beam is relatively heavy, which in turn is due to inter alia the need to dimension it in accordance with the load from the dashboard, the steering system and in certain cases the air conditioning unit also. In particular, the cross beam must be able to withstand vibrations which arise on account of the mass of the steering wheel and the steering system. The requirements set with regard to crash safety also demand that the cross beam be dimensioned so that it can absorb great loads in the event of a collision, on the one hand loads from inside the car (i.e. from the steering system etc.) and on the other hand loads from outside.

In certain cases, a particular problem arises on account of the fact that the air conditioning unit is suspended from the cross beam and therefore gives rise to a great load on the cross beam. The relatively great weight of the air conditioning unit, roughly 12 kg, of course contributes to this great load. The cross beam must thus be dimensioned so as to support the air conditioning unit and also in order to withstand vibrations which arise as a result of the cross beam vibrating together with the air conditioning unit.

DESCRIPTION OF THE INVENTION

The object of the present invention is to provide an improved arrangement for a body structure of a vehicle, in particular to provide an arrangement with low weight and high strength, which can easily be built into a vehicle and also has a high degree of functional integration of components in the region around the dashboard in a vehicle. This object is achieved by means of an arrangement having the features that emerge from Patent Claim 1 below.

The invention comprises a load-carrying structure which is arranged essentially transversal to the longitudinal direction of the vehicle and which is mounted in each side of the vehicle, and an air conditioning system comprising an air conditioning unit having components for air treatment. The invention is characterized in that at least a section of the air conditioning unit is functionally integrated with said beam structure. It may be mentioned that the loads which are meant to be absorbed by the load-carrying structure consist on the one hand of loads which act on the body of the vehicle (and which have an effect on its strength and rigidity) and on the other hand loads which arise as a result of different components being mounted on said structure.

By means of the invention, an arrangement is provided, in which the air conditioning unit can be integrated with air distribution ducts which in turn constitute a part of said load-carrying structure. According to a preferred embodiment, the casing of the air conditioning unit is adapted so that it contributes to a reinforcing function and high strength.

The arrangement according to the invention has a high degree of integration, i.e. the arrangement can be prefabricated from different parts into a single functionally integrated component which is then mounted in a vehicle. Such functional integration can be brought about, for example, by an intermediate panel in the vehicle at least in part constituting a side wall of a casing for the air conditioning system.

In contrast to traditional vehicle technology, where the cross beam and the intermediate panel are arranged with the aid of a number of different separate components which are packed together and mounted in place in the vehicle, the present invention is based on the fundamental idea that the entire transverse beam structure constitutes a part which is integrated with the rest of the vehicle body.

By virtue of the invention, lower weight, easier manufacture and easier mounting in a vehicle are achieved. A simpler arrangement with fewer partitions is obtained in the body structure according to the invention because, for example, the intermediate panel can simultaneously constitute a wall in the air conditioning unit.

According to the invention, the weight can be reduced considerably in comparison with conventional systems with a lower degree of integration. In spite of the low weight, the invention allows the exacting requirements for strength and rigidity that prevail in connection with modern passenger cars to be satisfied.

Further advantageous embodiments of the invention emerge from the dependent patent claims below.

The term "air conditioning unit" means in this context an assortment of the components, in the form of heat exchanger, blower, filter, evaporator and components for air regulation, which can be used for generating and treating temperature-controlled air and also a casing which accommodates these components.

The term "air conditioning system" means in this context the system consisting of the air conditioning unit and also a number of ducts, panel vents etc. for distribution of air to desired points in the vehicle.

The term "functional integration" refers in this context to the fact that a given element in the vehicle is arranged in such a manner that it has at least two functions, which can be exemplified by the partition at the same time constituting a side wall of the casing of the air conditioning unit. Therefore, said term does not merely refer to the fact that two components are mounted next to one another or are manufactured in a single piece.

DESCRIPTION OF THE FIGURES

The invention is described in greater detail below with reference to a preferred exemplary embodiment and the appended figures, in which.

PREFERRED EMBODIMENTS

Figure 1:
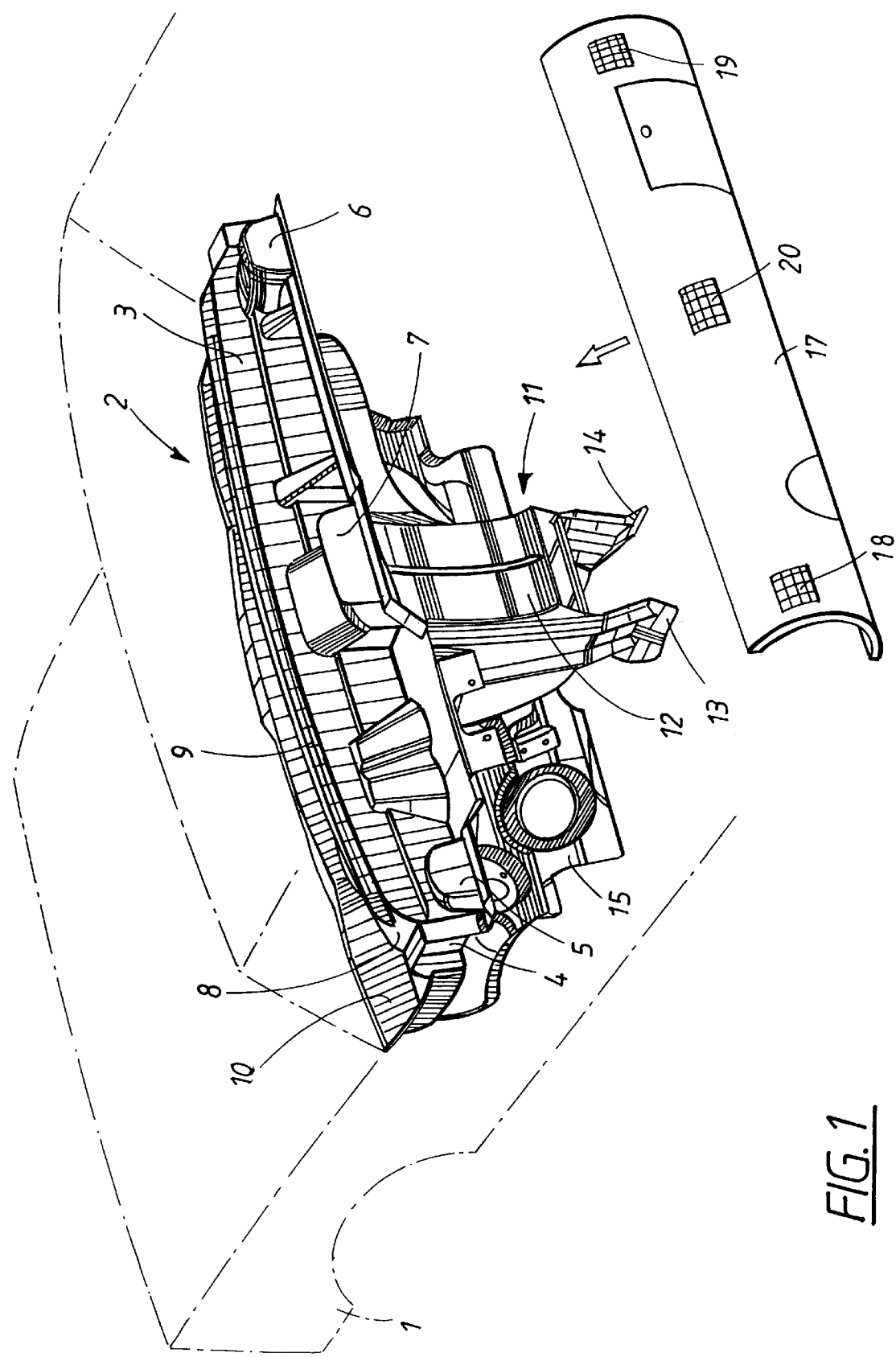
FIG. 1 is a diagrammatic perspective view of an arrangement according to the present invention.
Figure 2:
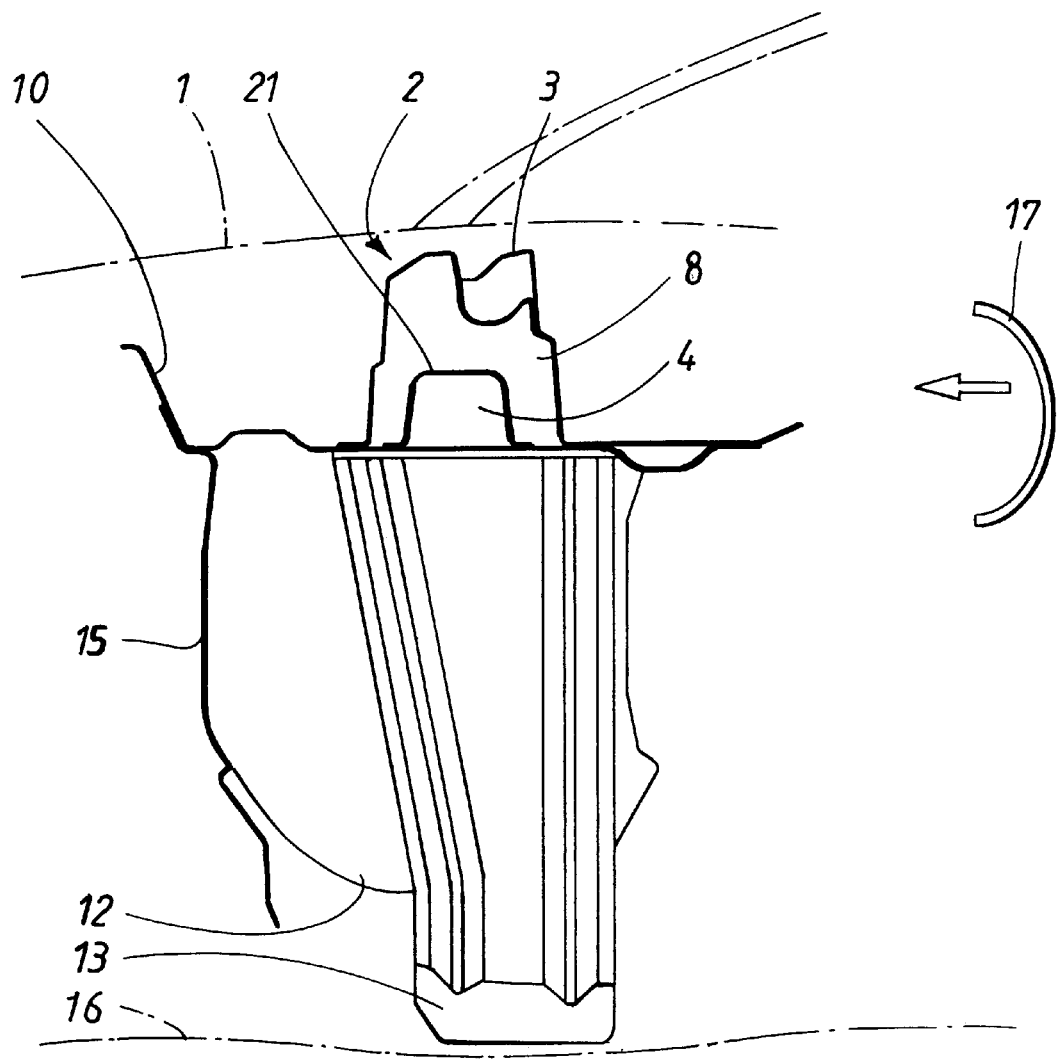
FIG. 2 is a cross-sectional view through the arrangement according to FIG. 1.

The invention is intended in particular for use in connection with a vehicle and constitutes a functionally integrated, load-carrying arrangement for a dashboard of the vehicle. FIGS. 1 and 2 show the fundamental construction of the invention and its mounting in a vehicle 1 (which is illustrated in broken lines).

According to a preferred embodiment, the invention is constructed around a body structure 2 which in turn is constructed from a number of components. Firstly, it may be mentioned that the body structure 2 comprises a load-carrying structure in the form of a windscreen beam 3. This windscreen beam 3 extends essentially transversely to the longitudinal direction of the vehicle 1 and spans the space between the side parts of the vehicle 1. The windscreen beam 3 also has an essentially box-shaped cross-section. According to what emerges especially clearly from FIG. 2, the windscreen beam 3 is designed so that it delimits a ventilation duct 4 which extends essentially between the end parts of the windscreen beam 3. The ventilation duct 4 opens into three air outlets 5, 6, 7, one in each end part of the windscreen beam 3 and one outlet 7 in the centre of the windscreen beam 3.

The windscreen beam 3 also delimits a transverse defroster duct 8 which in turn comprises an air outlet 9 which is directed towards the windscreen of the vehicle 1 when the windscreen beam 3 is mounted. The body structure 2 also comprises a plenum chamber 10 which consists of a sealed space in the form of a shelf which extends transversely to the longitudinal direction of the vehicle 1 and is located at the very back of its engine space.

The windscreen beam 3 is at least in part functionally integrated with an air conditioning unit 11 which, in a manner known per se, forms part of an air conditioning system comprising components for generating temperature-controlled air and for treating (e.g. filtering) air. The air conditioning system also comprises ducts for distribution of air in the vehicle 1. Said components may consist of, for example, a blower, an air filter, an evaporator and a heat exchanger. The air conditioning unit 11 is connected to and adapted to feed air to the ventilation duct 4 and the defroster duct 8.

The air conditioning unit 11 is designed with a casing 12 which accommodates said components, or at least certain of these components. The casing 12 is preferably connected to two support legs 13, 14. The casing is also essentially box-shaped and is positioned below the windscreen beam 3 and next to another element in the form of an intermediate panel 15. This intermediate panel 15 preferably constitutes a functionally integrated part of the transverse body structure 2 and is essentially in the form of a plate extending essentially transversely to the longitudinal direction of the vehicle 1. In a manner known per se, the purpose of the intermediate panel 15 is to separate the passenger compartment of the vehicle 1 from its engine space.

According to the embodiment, the air conditioning unit 11 is designed so that its support legs 13, 14 are rigidly connected to a body part, preferably the floor 16 of the vehicle (see FIG. 2). Alternatively, the casing 12 itself may be deigned in such a manner that it is built together with the floor 16 (i.e. without use being made of any separate support legs). According to another alternative embodiment, the air conditioning unit 12 may also be designed so that it does not rest against the floor 16. By designing it as a part of the transverse load-carrying structure, it still has a load-absorbing and reinforcing function.

The body structure 2 is adapted to support additional components (not shown), e.g. steering column, pedal set, audio system and the like. During final assembly of the vehicle 1, the body structure 2 is provided with a dashboard cover 17 which is mounted so that it covers the body structure 2. According to the invention, the dashboard cover 17 does not essentially have any load-carrying function but supports only smaller components, e.g. panel vents 18, 19, 20, through which air from the ventilation duct 4 is fed into the passenger compartment of the vehicle 1.

A fundamental principle underlying the invention is that the body structure 2 is adapted so that it allows a high degree of functional integration so that at least a section of the air conditioning unit, e.g. the walls of its casing 12, is functionally integrated with the windscreen beam 3 or the intermediate panel 15. In this manner, the walls of the casing 12 (e.g. its upper delimiting walls) can at the same time constitute delimiting walls of the ventilation duct 4 and/or the defroster duct 8. Another example of this functional integration is that the windscreen beam 3 is arranged so that a given wall can have two different functions, e.g. the partition 21 (see FIG. 2) which delimits the ventilation duct 4 from the defroster duct 8 can consist of a single wall instead of applying the approach of known art where these two ducts are usually mounted as two separate units in a cross beam (and therefore have two partitions). Furthermore, the rear wall of the casing 12 preferably constitutes at the same time a part of the intermediate panel 15.

A further example of the functional integration is that the casing 12 can at the same time constitute a sound absorber or sound insulation for limiting engine noise in the passenger compartment of the vehicle. The ventilation duct 4 and the defroster duct 8 also constitute load-absorbing components which form part of the transverse windscreen beam 3. The air conditioning unit 11 also constitutes a reinforcing component (besides being adapted for treating air) by virtue of its being functionally integrated with the windscreen beam 3. The support legs 13, 14 can also at the same time function as side walls of the casing 12 of the air conditioning unit.

It is therefore the case that at least a section of the air conditioning system forms part, as a supporting structure component, of the body structure 2 according to the invention, which contributes to high load absorption and reduced weight in the complete vehicle body. By virtue of in particular the casing 12 of the air conditioning unit 11 being functionally integrated with the windscreen beam 3, the casing 12 is arranged as a box construction with a reinforcing function. This contributes to increased strength of the structure.

The integrated arrangement according to the figures is suitably manufactured by joining together a number of different parts. The parts included in the body structure 2, i.e. the windscreen beam 3, the ventilation duct 4, the defroster duct 8, the casing 12 of the air conditioning unit, the support legs 13, 14, the plenum chamber 10 and the intermediate panel 15, are preferably manufactured from fibreglass-reinforced polypropylene and are suitably formed by means of hot pressing which is known per se. By virtue of this material selection and the functional integration described above, considerable weight-saving is achieved in comparison with previous arrangements with a lower degree of integration. By virtue of the material selection, the arrangement according to the invention can also be made recyclable, which of course has environmental advantages.

The various parts are preferably joined together by welding. After the parts have been joined together, a complete, integrated structure is obtained, which can be delivered to a car manufacturer and then mounted in the vehicle 1 as a single unit in connection with a process for vehicle manufacture. The arrangement according to the invention is therefore suitable for mass production of vehicles. Furthermore, the integration of the body structure according to the invention contributes, by virtue of the various parts being welded together, to a reduction in annoying noise and squeaking.

During final assembly of the vehicle 1, the body structure 2 is arranged so that it is connected to the rest of the body of the vehicle 1. For example, each end part of the windscreen beam 3 can be mounted rigidly on the respective side of the vehicle 1, but the windscreen beam 3 or the intermediate panel 15 may also be fixed to the floor 16 so that the body structure 2 constitutes a part which is integrated with the rest of the vehicle 1.

The invention is not limited to the exemplary embodiment described above and shown in the drawings but can be modified within the scope of the patent claims below. For example, the invention can be used in different types of vehicle, e.g. passenger cars and lorries.

A number of different materials can be used for the parts included in the body structure 2. As far as plastic materials are concerned, both thermoplastics and thermosets can be used. Furthermore, parts can in principle be manufactured from, for example, sheet steel, aluminium or magnesium, or alloys containing these materials. Combinations of different materials in different components are also possible. For example, the intermediate panel 15 can be manufactured from sheet steel while the casing 12 of the air conditioning unit can be made from a composite material.

It is also possible for the windscreen beam 3 to be designed with, for example, a duct (not shown) for electric cabling, in addition to the ventilation and defroster ducts 4 and 8 respectively, which are shown.

Finally, the windscreen beam 3 does not necessarily have to extend from side to side in the vehicle 1 but it can be mounted in the vehicle 1 via its floor 16.

What is claimed is:

1. A body structure arrangement of a vehicle, comprising:
   a load-carrying beam structure which is rigidly positioned essentially transversal to the longitudinal direction of the vehicle between side parts of the vehicle; and
   an air conditioning system comprising an air conditioning unit having components for air treatment, which air conditioning unit comprises a casing which at least partly accommodates said components for air treatment, wherein
   said beam structure providing said vehicle with a rigidity and a mounting for components of said air conditioning unit, said air conditioning unit is functionally integrated with said beam structure, and wherein said beam structure comprises an intermediate panel which serves to separate the passenger compartment of the vehicle from its engine space and at the same time to at least in part constitute a side wall of said casing so as to define a single integrated component that can be mounted in the vehicle during assembly of the vehicle.

2. The arrangement according to claim 1, wherein said casing is designed as a reinforcing and force-absorbing element for loads acting on said beam structure.

3. The arrangement according to claim 1, wherein the intermediate panel constitutes a functionally integrated part of said beam structure.

4. The arrangement according to claim 1, wherein said air conditioning system comprises ducts for air distribution, which ducts are designed in an integrated manner in said beam structure.

5. The arrangement according to claim 4, wherein said ducts for air distribution comprise a defroster duct and a ventilation duct.

6. The arrangement according to claim 4, wherein said casing at least in part constitutes a delimiting wall of one of said ducts.

7. The arrangement according to claim 1, wherein said body part consists of a floor of the vehicle.

8. The arrangement according to claim 1, wherein said beam structure and the air conditioning unit are manufactured essentially from fiberglass-reinforced polypropylene.

* * * * *